(12) United States Patent
Sekiya et al.

(10) Patent No.: US 12,006,632 B2
(45) Date of Patent: Jun. 11, 2024

(54) MONITORING SYSTEM (71) Applicant: MAINTECH CO., LTD., Tokyo (JP)

(72) Inventors: Hiroshi Sekiya, Tokyo (JP); Hitomaru Sakata, Fuji (JP); Daisuke Kobayashi, Tokyo (JP); Ayano Suga, Tokyo (JP)

(73) Assignee: MAINTECH CO., LTD., Tokyo (JP)

( * ) Notice: Subject to any disclaimer, the term of this patent is extended or adjusted under 35 U.S.C. 154(b) by 665 days.

(21) Appl. No.: 17/277,836

(22) PCT Filed: Oct. 1, 2019

(86) PCT No.: PCT/JP2019/038764
§ 371 (c)(1),
(2) Date: Mar. 19, 2021

(87) PCT Pub. No.: WO2020/071370
PCT Pub. Date: Apr. 9, 2020

(65) Prior Publication Data
US 2021/0348334 A1    Nov. 11, 2021

(30) Foreign Application Priority Data
Oct. 1, 2018   (JP) ................ 2018-186934

(51) Int. Cl.
*D21G 9/00*    (2006.01)
*G01N 21/892*    (2006.01)
(Continued)

(52) U.S. Cl.
CPC ......... *D21G 9/0054* (2013.01); *D21G 9/0027* (2013.01); *G01N 21/892* (2013.01); *G05B 15/02* (2013.01); *H04N 7/18* (2013.01)

(58) Field of Classification Search
CPC .. D21G 9/0054; D21G 9/0027; D21G 9/0009; G01N 21/892; G01N 21/84;
(Continued)

(56) References Cited

U.S. PATENT DOCUMENTS

| | | |
|---|---|---|
| 2002/0166970 A1 | 11/2002 | Komulainen et al. |
| 2004/0035540 A1 | 2/2004 | Tapio et al. |
| 2006/0162887 A1 * | 7/2006 | Weinstein ............ D21G 9/0036 162/263 |

FOREIGN PATENT DOCUMENTS

| | | | | |
|---|---|---|---|---|
| EP | 0979995 A1 * | 2/2000 | ............. | G01N 21/89 |
| EP | 0979995 A1 | 2/2000 | | |

(Continued)

OTHER PUBLICATIONS

The extended European search report for the corresponding EP application No. 19869669.2 mailed Jun. 2, 2022.
(Continued)

*Primary Examiner* — Michael J Brown
(74) *Attorney, Agent, or Firm* — Muncy, Geissler, Olds & Lowe, P.C.

(57) ABSTRACT

An object is to provide a monitoring system capable of preventing the occurrence of a defect in paper by monitoring the device. The present invention is directed to a monitoring system A having a papermaking machine 1 for manufacturing paper X, an applying device 2 for applying a chemical solution to a site of the papermaking machine directly or indirectly in contact with the paper while the papermaking machine 1 is operated, a control panel 3 for setting an application condition of the applying device 2, a monitoring camera 4 for monitoring a monitoring target site, and a control device 5 connected to the monitoring camera 4 via a network. The monitoring target site is the site of the papermaking machine 1 directly or indirectly in contact with the paper X and/or the applying device 2, and the control device 5 has a computing unit S1 which converts a state of the monitoring target site into a numerical form by using video taken by the monitoring camera 4, a display unit S2 which displays detection data obtained by conversion into (Continued)

the numerical form at the computing unit S1, and a storage unit S3 which stores the detection data.

4 Claims, 6 Drawing Sheets

(51) Int. Cl.
*G05B 15/02* (2006.01)
*H04N 7/18* (2006.01)
*D21F 1/32* (2006.01)
*G01N 21/84* (2006.01)

(58) Field of Classification Search
CPC ... G01N 2021/8411; G01N 2021/8917; G01N 21/01; G01N 21/8851; G01N 2021/0143; G01N 2021/0181; G05B 15/02; H04N 7/18; D21F 7/00; D21F 1/32
USPC .......................................................... 700/128
See application file for complete search history.

(56) References Cited

FOREIGN PATENT DOCUMENTS

| | | |
|---|---|---|
| JP | H02-90047 A | 3/1990 |
| JP | 07-122616 A | 5/1995 |
| JP | H07-122616 B2 | 12/1995 |
| JP | 2003213585 A | 7/2003 |
| JP | 2015148556 A | 8/2015 |
| WO | 00/45156 A1 | 8/2000 |
| WO | 2002/20901 A1 | 3/2002 |

OTHER PUBLICATIONS

English Translation of International Search Report of PCT/JP2019/038764 mailed Dec. 24, 2019.

* cited by examiner

| | | Stationary state | | Non-stationary state | |
|---|---|---|---|---|---|
| | | Chemical-solution application amount cc/min | Spread width mm | Chemical-solution application amount cc/min | Spread width mm |
| Brand1 | #1D | 5.0 | 5000 | 7.0 | 5000 |
| | #10D | 5.0 | 5000 | 7.0 | 5000 |
| | 1upperCv | 10.0 | 5000 | 12.0 | 5000 |
| | 2upperCv | 10.0 | 5000 | 12.0 | 5000 |
| Brand2 | #1D | 7.0 | 4800 | 9.0 | 4800 |
| | #10D | 8.0 | 4800 | 10.0 | 4800 |
| | 1upperCv | 12.0 | 4800 | 14.0 | 4800 |
| | 2upperCv | 12.0 | 4800 | 14.0 | 4800 |

FIG.6

MONITORING SYSTEM

TECHNICAL FIELD

The present invention relates to monitoring systems and, in more detail, to a monitoring system capable of, by preventing contamination of a monitoring a site of a papermaking machine directly or indirectly in contact with paper and/or an applying device, preventing contamination of the papermaking machine and clogging of the applying device.

BACKGROUND ART

A papermaking machine, which is a machine for manufacturing paper, has: a wire part in which, in general, a liquid with pulp dispersed in water is put on a screen (wire) for papermaking and superfluous water is caused to freely fall; a press part in which the liquid is caused to pass between paired press rolls and pressed by press rolls via felt, thereby causing moisture in paper to be transferred to felt, thereby dewatering the paper; a dryer part in which the paper passing through the press part is dried be being in contact with a heated cylinder via a canvas to be made as paper; and a reel part in which the paper is reeled up to a rod called a spool.

Meanwhile, in the papermaking machine, a monitoring system is adopted for quality inspections and so forth of the manufactured paper.

For example, a paper quality monitoring device has been known, which includes a video camera which captures running paper as a still two-dimensional image, an A/D converter which receives an output from the video camera, a memory which receives an output from the A/D converter, a first image signal processing device which is connected to the memory, issues a call instruction to the memory to input that information, and performs texture analysis by frequency analysis or standard deviation process, a second image signal processing device which receives digital information from the memory upon the call instruction from the first image signal processing device and performs paper flaw analysis, a third image signal processing device which similarly receives digital information from the memory and performs paper streak analysis, a computing device which receives outputs from the first to third image signal processing devices and signals about a jet speed, a wire speed, and a material concentration of a papermaking machine and performs correlation analysis among the jet speed, the wire speed, and the material concentration and texture indexes and a streak, and a display device which is coupled to the computing device to display its output (for example, refer to PTL 1).

CITATION LIST

Patent Literature

PTL 1: Japanese Examined Patent Application Publication No. 07-122616

SUMMARY OF INVENTION

Technical Problem

However, while the monitoring system for monitoring paper including the monitoring device described in the above-described PTL 1 can find a defect in paper, there is a problem in which the monitoring system cannot find a defect in the device. That is, since a defect in paper is often due to a defect in the device, it is impossible to prevent a defect from occurring in paper unless a defect in the device is monitored.

The present invention was made in view of the above-described circumstances, and has an object of providing a monitoring system capable of preventing a defect from occurring in paper by monitoring the device.

Solution to Problems

The inventors have diligently conducted studies to solve the above-described problems and have found that the above-described problems can be solved not by monitoring the paper but by intentionally providing a monitoring camera for monitoring to a site of a papermaking machine directly or indirectly in contact with paper and/or an applying device and monitoring this, leading to completion of the present invention.

The present invention resides in (1) a monitoring system having a papermaking machine for manufacturing paper, an applying device for applying a chemical solution to a site of the papermaking machine directly or indirectly in contact with the paper while the papermaking machine is operated, a control panel for setting an application condition of the applying device, a monitoring camera for monitoring a monitoring target site, and a control device connected to the monitoring camera via a network, wherein the monitoring target site is the site of the papermaking machine directly or indirectly in contact with the paper and/or the applying device, and the control device has a computing unit which converts a state of the monitoring target site into a numerical form by using video taken by the monitoring camera, a display unit which displays detection data obtained by conversion into the numerical form at the computing unit, and a storage unit which stores the detection data.

The present invention resides in (2) the monitoring system according to the above-described (1), wherein the control device is connected to the control panel via a network, the control device further has an input unit which set a corrected application condition with the application condition corrected, based on the detection data, and an output unit which transmits the corrected application condition to the control panel, and with the control panel receiving data of the corrected application condition, the application condition in the control panel is changed to the corrected application condition.

The present invention resides in (3) the monitoring system according to the above-described (1) or (2), wherein the storage unit further stores occurrence information when a non-stationary state occurs, from the detection data and the occurrence information accumulated in the storage unit, the computing unit sets a threshold of the presence or absence of occurrence of the non-stationary state, and in excess of the threshold, an alert is displayed on the display unit.

The present invention resides in (4) the monitoring system according to the above-described (2), wherein the storage unit further stores occurrence information when a non-stationary state occurs and the corrected application condition, from the detection data, the occurrence information, and the corrected application condition accumulated in the storage unit, the computing unit sets a threshold of the presence or absence of occurrence of the non-stationary state and the corrected application condition in excess of the threshold, and in excess of the threshold, an alert is displayed on the display unit and the application condition in the control panel is changed to the corrected application condition.

The present invention resides in (5) the monitoring system according to any one of the above-described (1) to (4), wherein the system further has a flaw detection camera which detects a flaw in the paper, the control device is connected to the flaw detection camera via a network, and flaw information of the paper by video taken by the flaw detection camera is displayed on the display unit.

The present invention resides in (6) the monitoring system according to any one of the above-described (1) to (5), wherein reference application conditions of a plurality of types in accordance with a type, material, and thickness of the paper is stored in advance in the storage unit, and the reference application condition is used as the application condition or the corrected application condition.

Advantageous Effects of Invention

In the monitoring system of the present invention, the monitoring camera is provided to the monitoring target site, and the detection data obtained by converting the state of the monitoring target site into a numerical form by using vide taken by the monitoring camera is displayed on the display unit. Thus, the presence or absence of occurrence of a non-stationary state of the monitoring target site during operation can be monitored. Note that the occurrence of the non-stationary state means a case in which the monitoring target site is not in a stationary state, that is, a state in which a defect occurs in the monitoring target site.

This allows a defect to be prevented from occurring in paper, based on the defect occurring in the monitoring target site.

Also, by adjusting the application condition of the chemical solution in accordance with the detection data, yields in manufacturing paper can be improved.

Furthermore, by adjusting the application condition of the chemical solution in accordance with the detection data, the amount of defects attached to remain on the device is reduced. Thus, efforts required for maintenance of the device can be significantly reduced.

Here, in the specification, the "defect" means a contaminant such as pitch attached to a site of the papermaking machine directly or indirectly in contact with paper when the site is the monitoring target site, and means that the chemical solution is not correctly applied to the device when the applying device is the monitoring target site, for example, clogging of the nozzle unit of the applying device. Also, a defect in paper means a contaminant such as pitch attached to the paper or a so-called paper break.

In the monitoring system of the present invention, when the control device is connected to the control panel via the network, any corrected application condition can be set in the input unit of the control device so as to correspond to the detection data displayed on the display unit.

Also, with the set corrected application condition transmitted from the output unit, the application condition in the control panel can be quickly changed to the corrected application condition.

In the monitoring system of the present invention, the detection data and the occurrence information are stored in the storage unit. Thus, by checking against the current detection data, the occurrence of a non-stationary state can be predicted.

Here, when the computing unit sets a threshold of the presence or absence of occurrence of a non-stationary state and in excess of the threshold, an alert indicating that a non-stationary state has occurred is displayed on the display unit. This allows noise to be removed and allows the occurrence of a non-stationary state to be automatically predicted.

Also, in addition to this, in excess of the threshold, the computing unit sets a corrected application condition so as to correspond to the detection data, and the application condition in the control panel is changed to the corrected application condition. With this, when a non-stationary state occurs, the application condition in the control panel can be automatically changed to the corrected application condition so as to correspond to the non-stationary state.

In the monitoring system of the present invention, the system further has a flaw detection camara which detects a flaw in the paper, and flaw information of the paper obtained from video taken by the flaw detection camera is displayed on the display unit, thereby allowing monitoring by checking the detection data against the flaw information.

Also, from these pieces of accumulated data, the threshold can be adjusted to an appropriate one.

Here, the storage unit stores machine learning results obtained by machine learning of a correspondence between the detection data and the flaw information by deep learning. When a flaw in paper occurs, the site of the papermaking machine and/or the applying device corresponding to the flaw is displayed on the display unit, thereby allowing the site of the papermaking machine and/or the applying device causing the flaw in paper to be quickly recognized.

In the monitoring system of the present invention, reference application conditions of a plurality of types in accordance with the type, material, and thickness of the paper is used as an application condition or a corrected application condition, thereby preventing troubles due to paper from occurring before they happen.

DESCRIPTION OF EMBODIMENTS

In the following, with reference to the drawings as required, a suitable embodiment of the present embodiment is described in detail.

Figure 1:
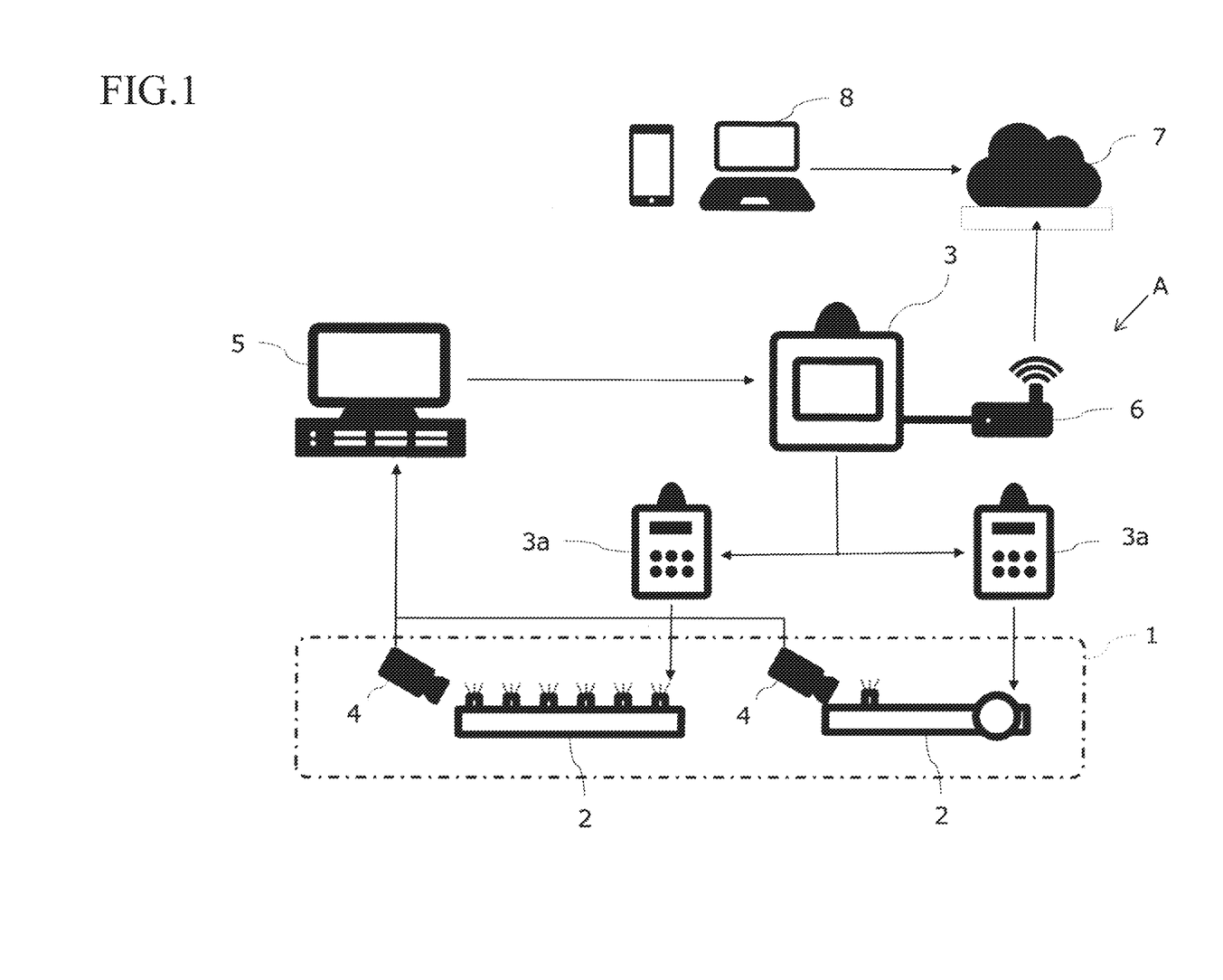
FIG. 1 is a block diagram for describing a monitoring system according to the present embodiment.

FIG. 1 is a block diagram depicting the outline of a monitoring system according to the present embodiment.

As depicted in FIG. 1, a monitoring system A according to the present embodiment has a papermaking machine 1 for manufacturing paper, applying devices 2 for applying a chemical solution while the papermaking machine 1 is operated, a control panel 3 for setting application conditions of the applying devices 2, monitoring cameras 4 for monitoring monitoring target sites, a control device 5 connected to the monitoring cameras 4 via a network, a cloud server 7 connected from a gateway 6 connected to the control panel 3 via a network, and an operator's computer 8 connected to the cloud server 7 via a network.

According to the above-described monitoring system A, a defect can be prevented from occurring in paper by monitoring the device.

The monitoring system A according to the present embodiment is used for the papermaking machine 1 for manufacturing paper.

Figure 2:
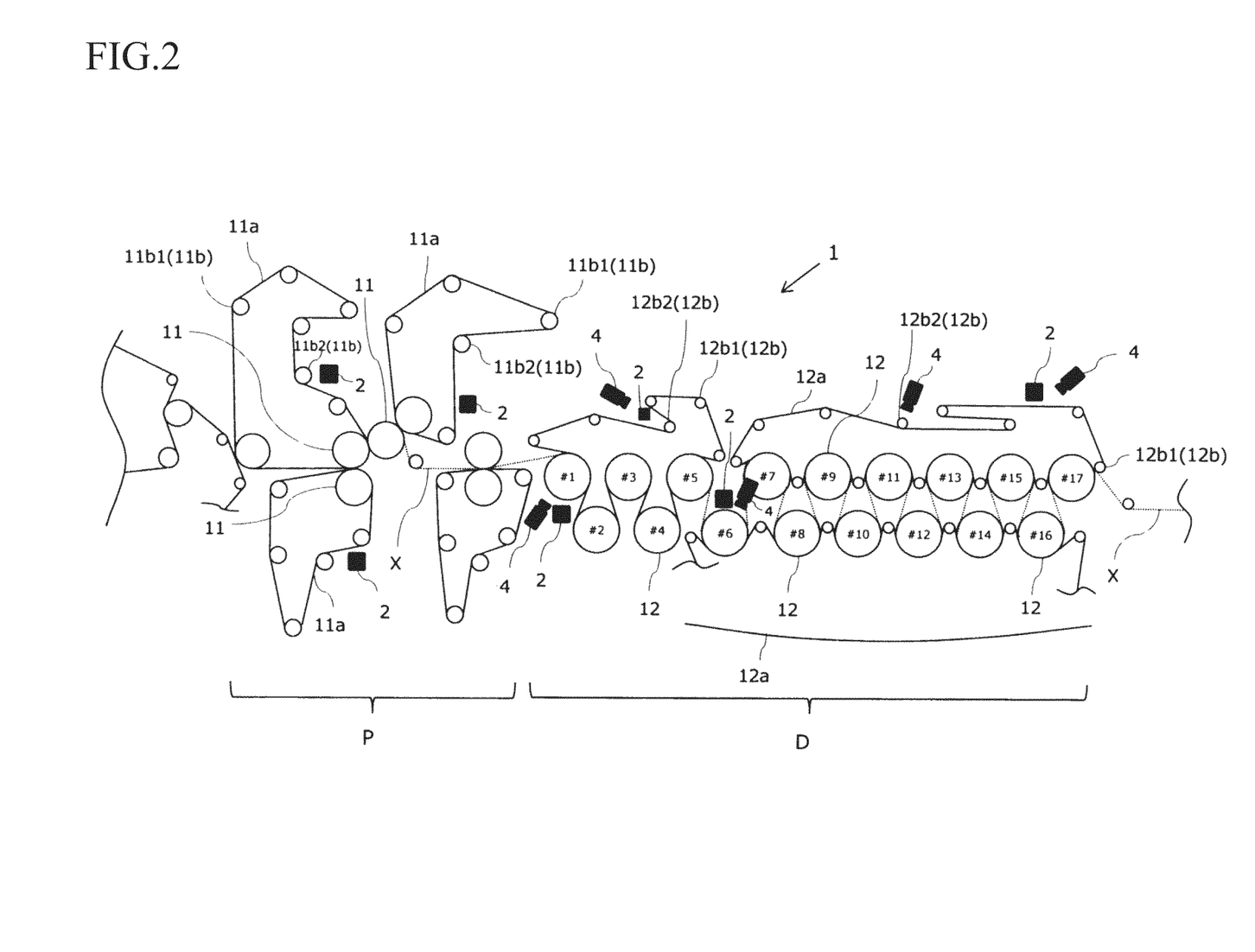
FIG. 2 is a schematic side view depicting a papermaking machine in the monitoring system according to the present embodiment.

FIG. 2 is a partial schematic side view depicting a part of the papermaking machine in the monitoring system according to the present embodiment.

As depicted in FIG. 2, the papermaking machine 1 has a wire part (not depicted), a press part P, a dryer part D, and a reel part (not depicted). Paper X guided by a plurality of guide rolls is subjected to process in each part.

The press part P has felt 11*a* for absorbing moisture of the paper X, press rolls 11 for pressing via the felt 11*a*, and felt rolls 11*b* for guiding the felt 11*a*. Also, the felt rolls 11*b* are formed of inner felt rolls 11*b*1 positioned inside the felt 11*a* and outer felt rolls 11*b*2 positioned outside the felt 11*a*.

The dryer part D has a canvas 12*a*, dryer rolls 12 for heating and drying the paper X via the canvas 12*a*, and the canvas rolls 12*b* for guiding the canvas 12*a*. Also, the canvas rolls 12*b* are formed of inner canvas rolls 12*b*1 positioned inside the canvas 12*a* and outer canvas rolls 12*b*2 positioned outside the canvas 12*a*.

In the monitoring system A, examples of the monitoring target sites include sites of the papermaking machine directly or indirectly in contact with paper and/or any applying device.

Specifically, examples of the monitoring target sites of the papermaking machine directly or indirectly in contact with paper include wires (not depicted), the felt 11*a*, the outer felt rolls 11*b*2, the dryer rolls 12, the canvas 12*a*, and the outer canvas rolls 12*b*2. By the way, a surface side of the canvas 12*a* in contact with the paper X is in contact with the outer canvas rolls 12*b*2.

Also, in any applying device, a nozzle unit (not depicted) is an example of the monitoring target site.

In the papermaking machine 1, a plurality of applying devices 2 are attached for applying a chemical solution to the sites of the papermaking machine directly or indirectly contact with paper while the papermaking machine 1 is operated.

For example, the applying devices 2 are attached so as to be opposed to the respective sites of the papermaking machine directly or indirectly in contact with paper to allow the chemical solution to be sprayed to these sites.

The applying device 2 has a nozzle unit, and a chemical solution can be discharged from that nozzle unit. Note that the structure of other than dischargeability from the nozzle unit is not particularly limited and any known one can be adopted as appropriate.

The chemical solution to be applied is not particularly limited, and its examples include an anti-pollutant agent and a parting agent.

The application condition in each applying device 2 can be set in the control panel 3 via child machines 3*a* of the control panel 3, which will be described further below (refer to FIG. 1). That is, the application condition set in the control panel 3 is transmitted to the relevant child machine 3*a*, and the applying device 2 connected to that child machine 3*a* operates with the application condition.

Here, examples of items of the application condition include an application device to be operated, the type of a chemical solution to be sprayed, the amount of application of a chemical solution to be sprayed from the nozzle unit, and so forth. Also, in addition to these, when the nozzle unit of the applying device is of a scanning type, examples of the items include the movement speed of the nozzle unit in a paper-width direction, the range in which the nozzle unit is moved, and so forth.

In the papermaking machine 1, a plurality of monitoring cameras 4 for monitoring while the papermaking machine 1 is operated are attached.

For example, the monitoring cameras 4 are each attached to the relevant monitoring target site so as to allow monitoring.

Note that since these monitoring target sites become at extremely high temperatures during operation of the papermaking machine, the monitoring cameras 4 preferably has heat resistance properties.

Referring back to FIG. 1, the monitoring camera 4 is connected to the control device 5 via a wired or wireless network. Thus, it is configured so that video of the monitoring target site taken by the monitoring camera 4 is transmitted to the control device 5.

The control panel 3 is connected to the control device 5 via a wired or wireless network. That is, this allows an application condition to be set at the control device 5 and transmitted to the control panel 3. Note that, as will be described further below, when a corrected application condition in which the application condition is corrected is set at the control device 5 based on the detection data, the application condition in the control panel 3 is changed to the corrected application condition.

Figure 3:
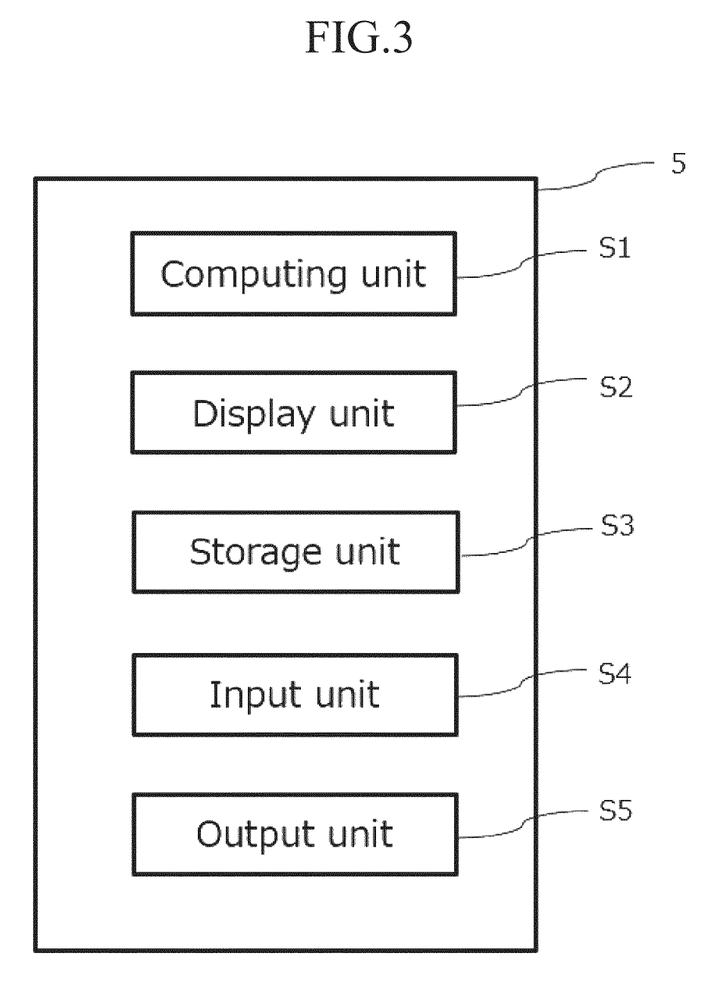
FIG. 3 is a block diagram depicting the structure of a control device in the monitoring system according to the present embodiment.

FIG. 3 is a block diagram depicting the structure of the control device in the monitoring system according to the present embodiment.

As depicted in FIG. 3, the control device 5 has a computing unit S1 which converts the state of each monitoring target site into a numerical form, a display unit S2 which displays detection data converted into the numerical form at the computing unit S1, a storage unit S3 which stores the detection data, an input unit S4 which sets, based on the detection data, a corrected application condition with an application condition corrected, an output unit S5 which transmits the corrected application condition to the control panel 3.

In the control device 5, the computing unit S1 converts the state of the monitoring target site into a numerical form by using video taken by the monitoring camera 4, based on software stored in the storage unit S3.

Specifically, when the monitoring target site is a site of the papermaking machine directly or indirectly in contact with paper, video of that site is converted into binary form, and its shades of gray are converted into a numerical form as, for example, 256 levels from 0 to 255.

Also, when the monitoring target site is any applying device, the nozzle unit and the chemical solution sprayed from the nozzle unit are subjected to RGB analysis for conversion into a numerical form. Note that by viewing the degree of reflection of blue or the degree of transparency of red, the aqua-spraying state can be recognized.

From these, detection data with the state of the monitoring target site converted into a numerical form is obtained.

Then, in the control device 5, the obtained detected data is displayed on the display unit S2. Here, video of the monitoring target site is preferably displayed, together with the detection data.

Figure 4:
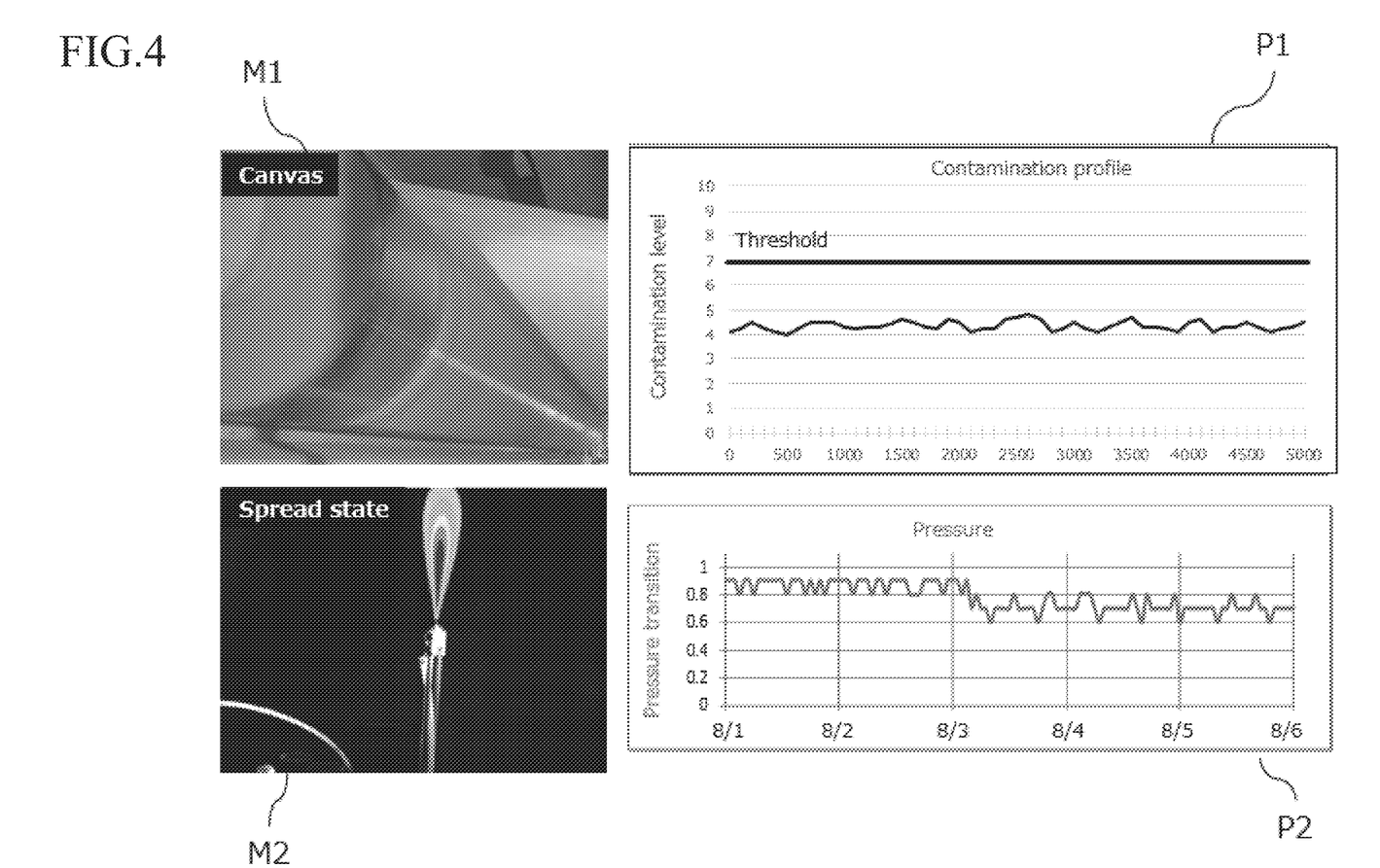
FIG. 4 is a diagram depicting an example of an image to be displayed on a display unit in the monitoring system according to the present embodiment.

FIG. 4 is a diagram depicting an example of an image to be displayed on the display unit in the monitoring system according to the present embodiment.

As depicted in FIG. 4, in the control device 5, for example, an image M1 of any outer canvas roll 12b2 and an image M2 of the nozzle unit of any applying device 2 are displayed on the display unit S2.

Also, a profile P1 in which a change amount of a binarized value during operation is converted into a numerical form with respect to a value obtained by binarizing a stationary state of the outer canvas roll 12b2 and a profile P2 in which a change amount of an RGB value during operation is converted into a numerical form with respect to a value of RGB of the nozzle unit of the applying device 2 in a stationary state are displayed. These profile P1 and profile P2 are detection data obtained by the computing unit S1.

By the way, when a contaminant such as pitch is attached to the outer canvas roll 12b2, the color becomes darker than that in a stationary state, and thus the binarized value is changed. Also, when clogging occurs at the nozzle unit of the applying device 2, the spread area of the chemical solution (in particular, aqua) is changed, and thus reflection of blue color in a stationary state or the state of the degree of transparency of red is changed.

In this manner, in the monitoring system A, the detection data converted into a numerical form at the computing unit S1 is displayed on the display unit S2, and it is thus possible to monitor the presence or absence of occurrence of a non-stationary state of the device during operation. Note that the non-stationary state means that the state is not stationary because a defect occurs or the like.

This allows a defect to be prevented from occurring in paper, based on a defect occurring in the device.

Also, by adjusting the application condition of the chemical solution in accordance with the detection data, yields in manufacturing paper can be improved.

Furthermore, by adjusting the application condition of the chemical solution in accordance with the detection data, the amount of defects attached to remain on the device can be reduced. Thus, entering inside the papermaking machine at high temperatures for maintenance can be omitted. That is, efforts required for maintenance of the device can be significantly reduced.

Referring back to FIG. 3, in the control device 5, an application condition is inputted by the input unit S4. Note that it is also possible to input, as appropriate, a corrected application condition with the application condition corrected so as to correspond to the detection data. With this, a (corrected) application condition is set. Note that items of the corrected application condition are common to the items of the application condition.

Then, the set (corrected) application condition is transmitted by the output unit S5 to the control panel 3.

Here, when the control panel 3 receives the (corrected) application condition information, the application condition is quickly changed to the corrected application condition.

Figure 5:
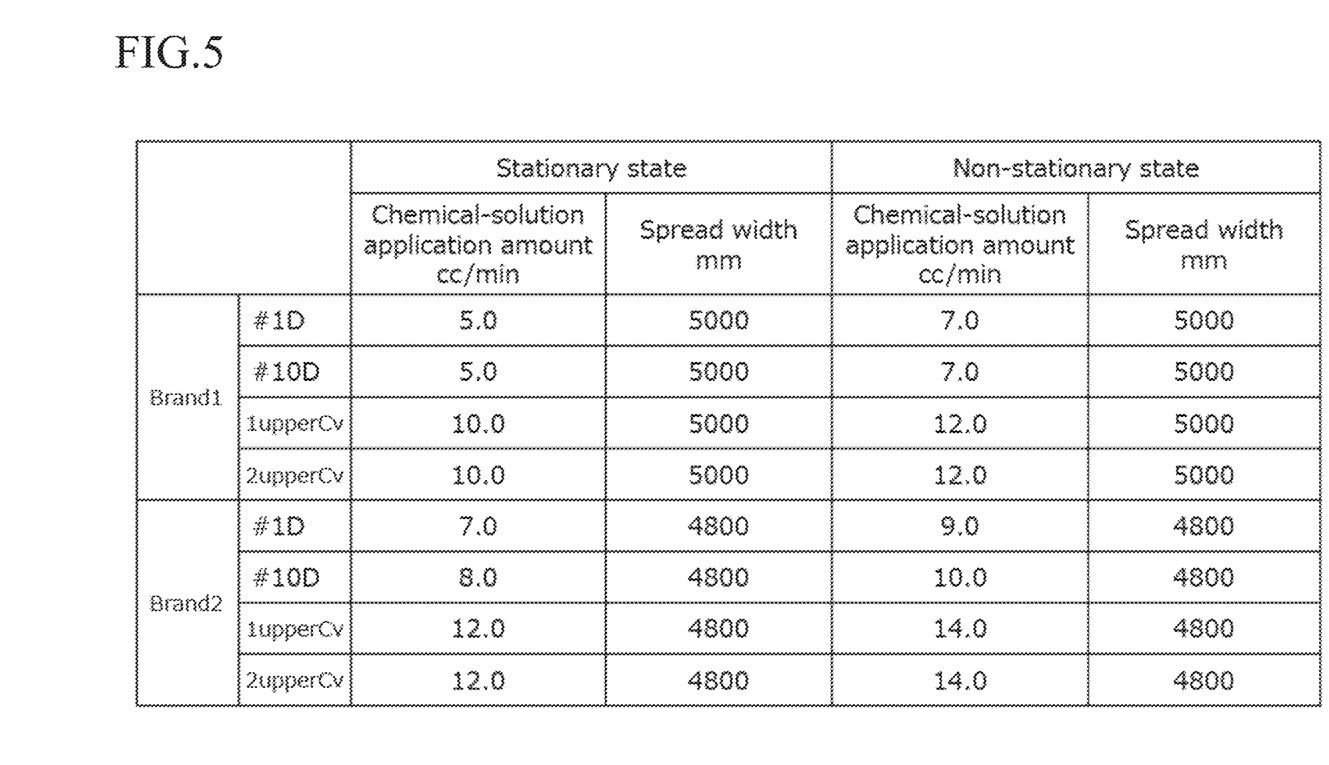
FIG. 5 is a table depicting an example of an application condition in a stationary state and a corrected application condition in a non-stationary state in the control device according to the present embodiment.

FIG. 5 is a table depicting an example of an application condition in a stationary state and a corrected application condition in a non-stationary state in the control device according to the present embodiment.

For example, while an application condition in a stationary state is set in the control panel, when a non-stationary state occurs, a change to an application condition in a non-stationary state (corrected application condition) can be automatically made.

Referring back to FIG. 3, in the control device 5, stored in the storage unit S3 are the image, the detection data, and the corrected application condition of the monitoring target site.

Also, reference application conditions of a plurality of types in accordance with the type, material, and thickness of paper may be stored in advance in the storage unit S3. These reference application conditions may be optionally set based on an empirical rule. With the reference application conditions being used as application conditions or corrected application conditions, it is possible to prevent troubles due to paper from occurring before they happen.

In the control device 5, further stored in the storage unit S3 is occurrence information when a non-stationary state occurs.

Here, the occurrence information means information about the position, time, and location of occurrence of a defect.

In the monitoring system A, by checking a sequence of changes of the image and the detection data of the monitoring target site accumulated in the storage unit S3 against the occurrence information, the occurrence of a non-stationary state can be predicted, and also expansion of the occurring defect can be prevented before it happens.

For example, in the monitoring system A, from the detection data and the occurrence information stored and accumulated in the storage unit S3, the computing unit S1 can set a threshold of the presence or absence of occurrence of a non-stationary state.

Specifically, among chronological detection data, the computing unit S1 sets a value when a non-stationary state occurred as a threshold. Note that this threshold can be set arbitrarily.

This allows the state to be prevented from being determined as a non-stationary state due to noise in the detection data. Also, it can be configured that, when a numerical value of the detection data exceeds the threshold during operation of the papermaking machine 1 (including the case in which the data partially exceeds the threshold in a paper width direction), it is determined that a non-stationary state occurs and an alert is displayed on the display unit S2. That is, the occurrence of a non-stationary state can be automatically predicted.

Figure 6:
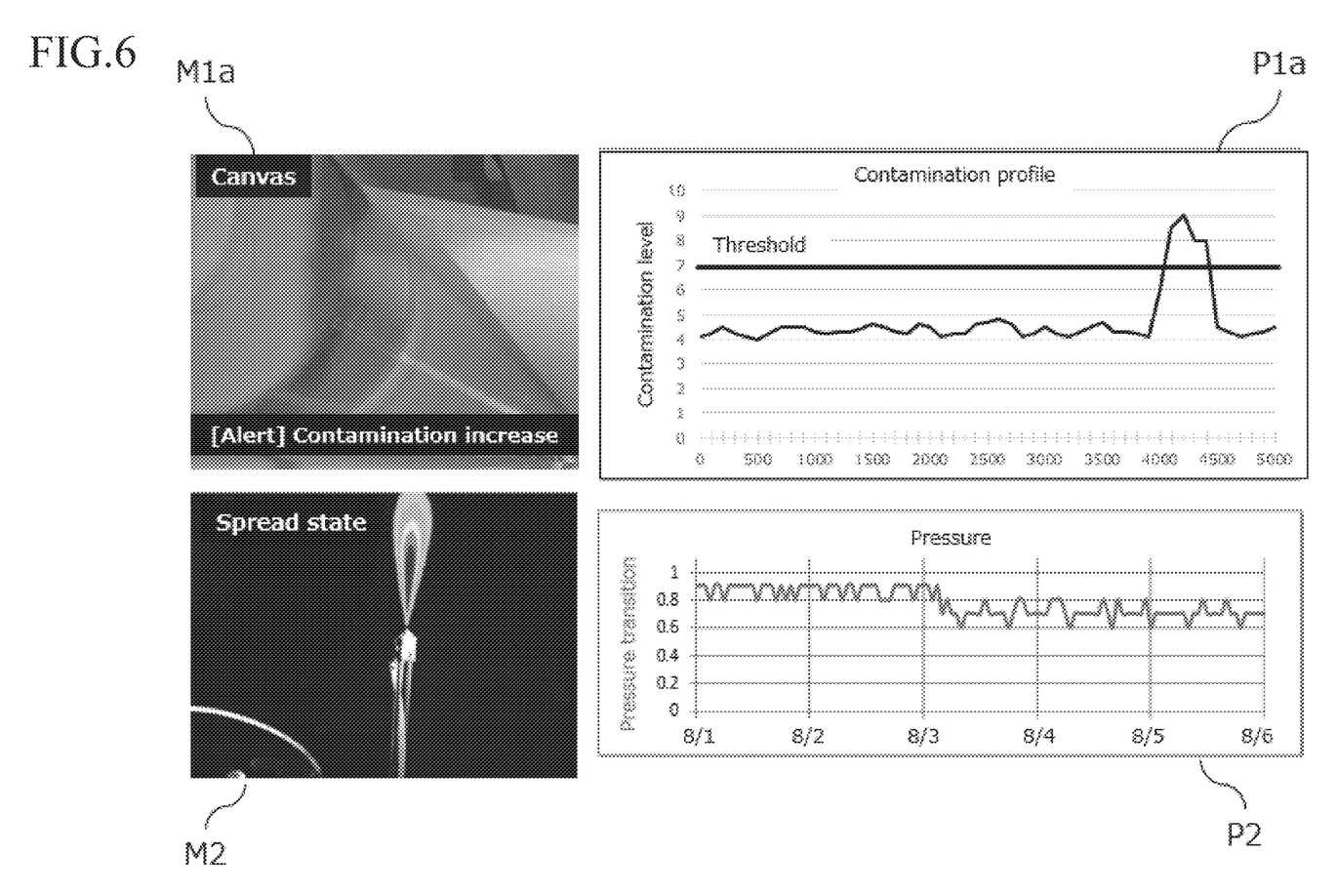
FIG. 6 is a diagram depicting an example of an image when an outer canvas roll becomes in a non-stationary state from the state of the example of the image to be displayed on the display unit depicted in FIG. 4.

FIG. 6 is a diagram depicting an example of an image when an outer canvas roll becomes in a non-stationary state from the state of the example of the image to be displayed on the display unit depicted in FIG. 4.

As depicted in FIG. 6, in a profile Pla of the outer canvas roll, when the detection data exceeds a threshold set in advance, an "alert" is displayed on an image M1a.

Note that the alert is displayed on the display unit S2 and also can be transmitted to the operator's computer 8 and, other than that, can be transmitted to another computer or a communication terminal such as a portable telephone.

In the monitoring system A according to the present embodiment, it is preferable that the system have further has a flaw detection camera (not depicted) which detects a flaw in paper, the control device 5 be connected to the flaw detection camera via a network, and flaw information of the paper be displayed on the display unit by using video taken by the flaw detection camera.

Note that the paper flaw information includes the position of the paper where the flaw occurs, the shape of the flaw, the size of the flaw, the number of flaws, and so forth.

In this case, monitoring can be performed by checking the detection data against the flaw information.

Also, from these pieces of data accumulated in the storage unit S3, the threshold can be adjusted to an appropriate one.

In the monitoring system A according to the present embodiment, the storage unit S3 can store machine learning results obtained by machine learning of a correspondence between the detection data and the flaw information by deep learning. With this, when a flaw in paper occurs, it is possible to estimate, based on the machine learning results, a site of the papermaking machine and/or the applying device corresponding to the flaw information of the flaw and cause this to be displayed on the display unit.

This allows the site of the papermaking machine and/or the applying device causing the flaw in paper to be quickly recognized.

Referring back to FIG. 1, in the monitoring system A according to the present embodiment, the image in a non-stationary state and the detection data obtained by conversion into a numerical form can be transmitted to the cloud server via the gateway 6.

In this case, with connection from the operator's computer 8 or a communication terminal such as a portable telephone to the cloud server, it is possible to recognize that the device is in a non-stationary state.

While the suitable embodiment of the present invention has been described above, the present invention is not meant to be limited to the above-described embodiment.

In the monitoring system A according to the present embodiment, while the applying devices 2 are attached so as to be opposed to the respective positions of the felt 11a, the outer felt rolls 11b2, the dryer rolls 12, the canvas 12a, and the outer canvas roll 12b2 to allow the chemical solution to be sprayed to these sites, these positions are not meant to be restrictive.

Also, the number of applying devices 2 are not restrictive.

In the monitoring system A according to the present embodiment, the application condition set in the control panel 3 is transmitted to the child machine 3a, and the applying device 2 connected to the child machine 3a operates with that application condition. However, the child machine 3a is not necessarily imperative.

Also, when an application condition is set in the control device 5 in place of the control panel 3, the application condition may be transmitted directly from the control device 5 to the child machine 3a.

In the monitoring system A according to the present embodiment, the monitoring cameras 4 are attached so as to be opposed to the dryer rolls 12, the canvas 12a, the outer canvas rolls 12b2, and the nozzle units of the applying devices 2. However, these positions are not meant to be restrictive.

In the monitoring system A according to the present embodiment, in FIG. 4 and FIG. 6, the image of the outer canvas roll 12b2 and the profile P1 and the image of the applying device 2 and the profile P2 are displayed, respectively, on the display unit S2. However, when the monitoring target sites are further increased, they are preferably displayed in a systematized manner by switching among a plurality of channels.

In the monitoring system A according to the present embodiment, connection is made via the gateway 6 to the cloud server 7. However, this is not necessarily imperative.

In the monitoring system A according to the present embodiment, the storage unit performs machine learning of a correspondence between the detection data and the flaw information by deep learning. However, this is not restrictive, and an analysis scheme such as regression analysis, multiple regression analysis, the MT method, a decision tree, or correlation analysis may be adopted.

INDUSTRIAL APPLICABILITY

The monitoring system A of the present invention is a monitoring system for monitoring a papermaking machine for manufacturing paper.

According to the monitoring system A of the present invention, a defect can be prevented from occurring not only in the device but in paper by monitoring the device.

REFERENCE SIGNS LIST

1 . . . papermaking machine
11 . . . press roll
11a . . . felt
11b . . . felt roll
11b1 . . . inner felt roll
11b2 . . . outer felt roll
12 . . . dryer roll
12a . . . canvas
12b . . . canvas roll
12b1 . . . inner canvas roll
12b2 . . . outer canvas roll
2 . . . applying device
3 . . . control panel
3a . . . child machine
4 . . . monitoring camera
5 . . . control device
6 . . . gateway
7 . . . cloud server
8 . . . operator's computer
A . . . monitoring system
D . . . dryer part
M1, M1a, M2 . . . image
P . . . press part
P1, P1a, P2 . . . profile
S1 . . . computing unit
S2 . . . display unit
S3 . . . storage unit
S4 . . . input unit
S5 . . . output unit
X . . . paper

The invention claimed is:

1. A monitoring system having a papermaking machine for manufacturing paper, an applying device for applying a chemical solution to a site of the papermaking machine directly or indirectly in contact with the paper while the papermaking machine is operated, a control panel for setting an application condition of the applying device, a monitoring camera for monitoring a monitoring target site, and a control device connected to the monitoring camera via a network, wherein the monitoring target site is dryer rolls, canvas, or canvas rolls of the papermaking machine directly or indirectly in contact with the paper and/or the applying device, and the control device has a computing unit which converts a state of the monitoring target site into a numerical form with binarizing by using video taken by the monitoring camera, a display unit which displays detection data obtained by conversion of a change amount of a binarized value during operation with respect to a value obtained by binarizing a stationary state into the numerical form at the computing unit, and a storage unit which stores the detection data.

2. The monitoring system according to claim 1, wherein
the storage unit further stores occurrence information when a non-stationary state occurs and a corrected application condition,
from the detection data and the occurrence information, and the corrected application condition accumulated in the storage unit, the computing unit sets a threshold of the presence or absence of occurrence of the non-stationary state and the corrected application condition in excess of the threshold, and
in excess of the threshold, an alert is displayed on the display unit and the application condition in the control panel is changed to the corrected application condition.

3. The monitoring system according to claim 2, wherein
the system further has a flaw detection camera which detects a flaw in the paper,
the control device is connected to the flaw detection camera via a network, and
flaw information of the paper by video taken by the flaw detection camera is displayed on the display unit.

4. The monitoring system according to claim 1, wherein
the system further has a flaw detection camera which detects a flaw in the paper,
the control device is connected to the flaw detection camera via a network, and
flaw information of the paper by video taken by the flaw detection camera is displayed on the display unit.

* * * * *